United States Patent
Hanrahan et al.

[11] Patent Number: 5,796,558
[45] Date of Patent: Aug. 18, 1998

[54] ADAPTIVE MICRO-ACTUATED HEAD GIMBAL ASSEMBLY

[75] Inventors: Kevin P. Hanrahan, Santa Barbara; Amanullah Khan, Temecula, both of Calif.

[73] Assignee: Read-Rite Corporation, Milpitas, Calif.

[21] Appl. No.: 857,136

[22] Filed: May 15, 1997

[51] Int. Cl.$^6$ .................... G11B 5/55; G11B 5/56
[52] U.S. Cl. ........................... 360/106; 360/109
[58] Field of Search ..................... 360/104, 106, 360/109, 107

[56] References Cited

U.S. PATENT DOCUMENTS

| | | | |
|---|---|---|---|
| 4,764,829 | 8/1988 | Makino | 360/109 X |
| 5,189,578 | 2/1993 | Mori et al. | 360/109 X |
| 5,216,559 | 6/1993 | Springer | 360/109 X |
| 5,303,105 | 4/1994 | Jorgenson | 360/106 |
| 5,521,778 | 5/1996 | Boutaghou et al. | 360/106 |

*Primary Examiner*—John H. Wolff
*Attorney, Agent, or Firm*—Nathan N. Kallman

[57] ABSTRACT

A disk drive has a head stack assembly with head arms which extend between adjacent magnetic disks. Each head arm includes head gimbal assemblies. The head arm is capable of pivoting about a first axis of rotation for providing the head gimbal assembly with a macro-actuation movement relative to a selected track on a disk, and for positioning the head gimbal assembly in an initial position relative to the selected track. A micro-actuator is connected to the head gimbal assembly so that the head gimbal assembly is pivotally secured to the head arm about a second axis independently of the pivotal movement of the head arm. This provides the head gimbal assembly with a micro-actuation movement relative to the selected track, such that if there is skew between the head gimbal assembly and the track, a micro-actuator provides correction to minimize the skew angle. Also the micro-actuator provides cancellation of transient and harmonic vibrations.

20 Claims, 2 Drawing Sheets

ADAPTIVE MICRO-ACTUATED HEAD GIMBAL ASSEMBLY

FIELD OF THE INVENTION

This invention relates to head gimbal assemblies and in particular to an adaptive micro-actuated head gimbal assembly for use in a disk drive.

BACKGROUND OF THE INVENTION

A typical disk drive comprises a plurality of head arm assemblies, each formed with a load beam and a flexure joined to the load beam. The flexure supports an air bearing slider on which a transducer is deposited at a trailing end. The load beam applies a predetermined gram load force to the head arm to urge the flexure and slider with its transducer towards the surface of a rotating disk during operation of the disk drive. The aerodynamics associated with the rotating disk opposes the load beam force so that the air bearing slider assumes a flying height relative to the surface of the disk.

The head arm assemblies are attached to an actuator, such as a voice coil motor, for moving the head arm assemblies and thus the sliders and transducers to selected data tracks on the disk for recording and reading data signals. The actuator may be a linear actuator or a rotary actuator for moving the head arms radially over the surface of the disk. In present day disk drives, the rotary actuator is used extensively.

The flying height of the air bearing slider depends on the disk velocity, the disk radius, specifically the track between the larger circumferential outer diameter (OD) and the smaller circumferential inner diameter (ID) at which the transducer is positioned, and the skew angle of the transducer relative to the disk track. The skew angle is the most difficult to isolate and control in rotary actuated disk drives.

The use of rotary actuators in disk drives results in variation of the skew angle between the inner and outer radii of the disk. The skew angle is an important factor in determining the slider flying height. As disk drives are miniaturized, the slider flying height is also reduced. For a slider to fly close to the disk surface, the head gimbal assembly must provide accurate control of the skew angle of the magnetic transducer.

SUMMARY OF THE INVENTION

An object of the present invention is to provide an adaptive micro-actuated head gimbal assembly for use in a disk drive in order to control and minimize the variation in skew angle of the transducer across the disk surface.

According to this invention, a disk drive comprises head arms which extend into spacings between adjacent magnetic disks. The disk drive includes a plurality of head gimbal assemblies, each of which is secured to a head arm. The head arm is capable of pivoting about a first axis of rotation for providing the head gimbal assembly with a macro-actuation movement relative to a destination track on the medium, and for positioning the head gimbal assembly in an initial position relative to the destination track.

A micro-actuator is connected to the head gimbal assembly for causing the head gimbal assembly to be pivotally secured to the head arm about a second axis independently of the pivotal movement of the head arm. This provides the head gimbal assembly with a micro-actuation movement relative to the destination track, such that if the initial position causes a skew angle to appear, the micro-actuation movement provides a correction for substantially reducing or eliminating the skew angle. The micro-actuator provides cancellation of transient and harmonic vibrations experienced by the disk drive, including the magnetic disks, the magnetic head arm assemblies and the components thereof.

BRIEF DESCRIPTION OF THE DRAWING

The invention will be described in greater detail with reference to the drawing in which.

Similar numerals refer to similar elements in the drawing. It should be understood that the sizes of the different components in the figures may not be in exact proportion, and are shown for visual clarity and for the purpose of explanation.

DETAILED DESCRIPTION OF THE INVENTION

Figure 1:
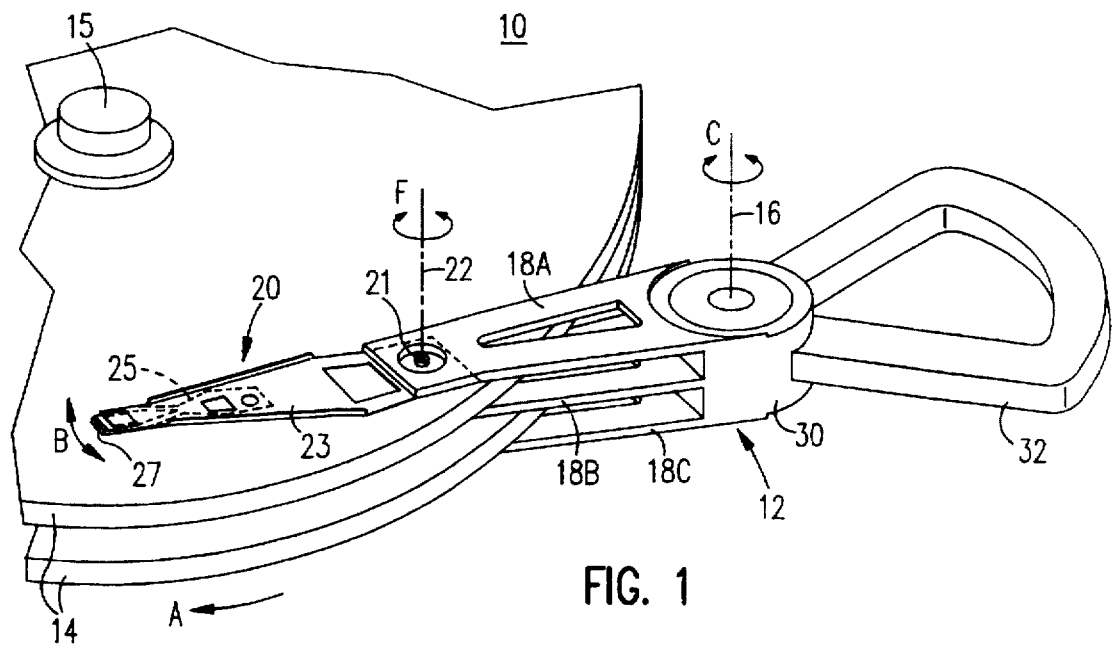
FIG. 1 is a fragmentary perspective view of a disk drive using a head gimbal assembly, according to the invention.

FIG. 1 illustrates a disk drive 10 comprising a head stack assembly 12 and a stack of spaced apart disks 14 rotatable about a common shaft 15. The head stack assembly 12 is rotatable about a first axis 16, as represented by the bidirectional arrow C. The head stack assembly 12 includes a plurality of head arms 18A, 18B, 18C which extend into spacings between the disks 14. The head arms 18A, 18B, 18C are similar and therefore only one head arm 18A will be described in detail.

A head gimbal assembly (HGA) 20 is pivotally secured to the head arm 18A by means of a micro-actuator 21. The HGA 20 is capable of pivoting about a second axis 22 in the direction of the bidirectional arrow F. The HGA 20 comprises a resilient load beam 23, a flexure 25, and a slider 27.

The head stack assembly 12 further includes an E-shaped block 30 and a magnetic rotor 32 attached to the block 30 in a position diametrically opposite to the head arms 18A, 18B, 18C. The rotor 32 cooperates with a stator to rotate about the first axis 16. Energizing the coil of the rotor 32 with a direct current in one polarity or the reverse causes the head stack assembly 12, including the head arms 18A, 18B, 18C with the HGAs to rotate about the first axis 16 thereby noving the head arms radially relative to the disk 14.

Figure 3:
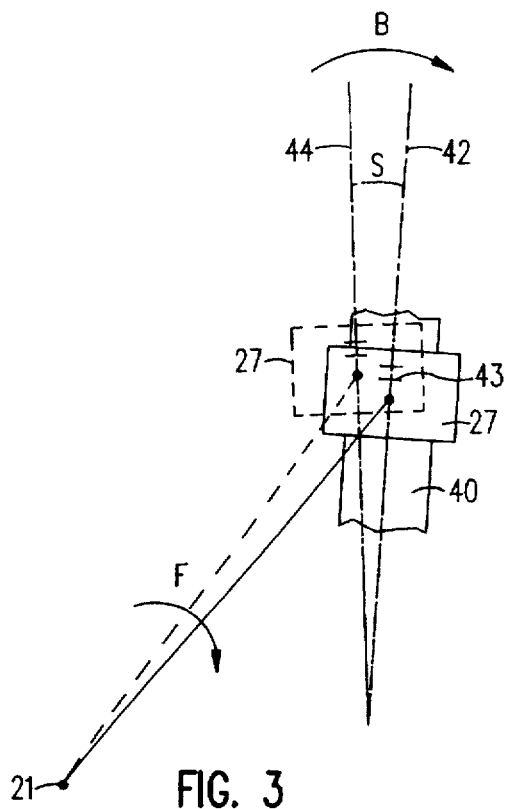
FIG. 3 is a greatly enlarged top plan view of a head forming part of the head gimbal assembly of FIG. 1, further illustrating the micro-actuation feature of the present invention.

This rotary movement is referred to herein as the coarse or "macro-actuation", wherein the slider is moved to a general position above a desired disk track. FIG. 3 illustrates the slider 27 (also shown in dashed line) above a disk track 40 subsequent to the macro-actuation of the head arm 18A and the HGA 20, prior to the corrective micro-actuation according to the present invention. The slider 27 is oriented at a skew angle "s" (see FIG. 3) above the track 40. As used herein, "skew angle" relative to a specific track refers to the angle between the tangent 42 to the radius of the track 40 at the head poles (or gap) 43, and a line 44 normal to the poles 43. In an ideal situation the skew angle "s" is zero.

Figure 2:
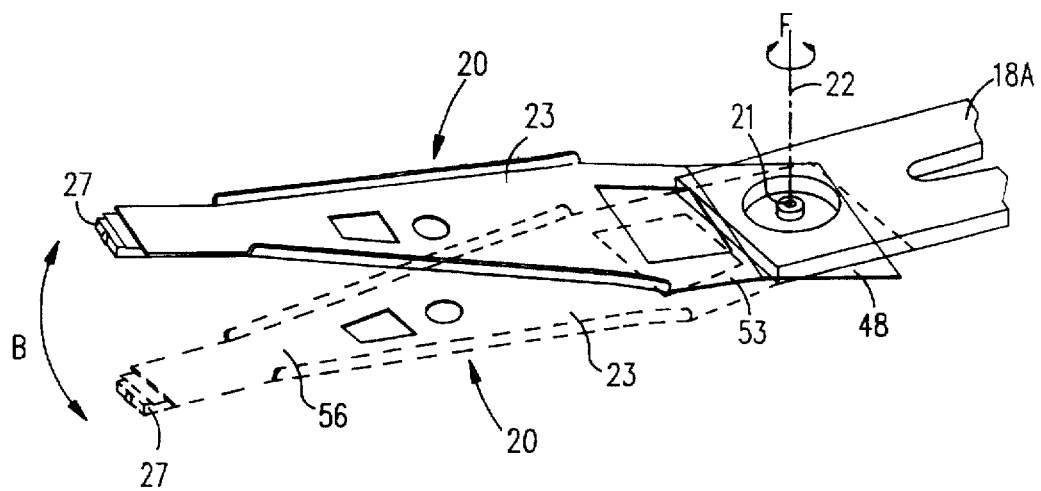
FIG. 2 is an enlarged perspective view of a load beam forming part of the head gimbal assembly of FIG. 1, illustrating the micro-actuation feature of the present invention.

An object of the present invention is to minimize the skew angle "s" by rotating the slider 27 about the second axis 22 so that the line 44 coincides, or substantially coincides with the tangent 42. This rotation is effectuated by a corrective micro-actuation movement which will now be described with reference to FIGS. 2 and 3.

The HGA 20 shown in dashed line corresponds to the initial position of the HGA above the track 40 prior to corrective micro-actuation, while the HGA 20 shown in solid line corresponds to the final corrected position above the track 40.

The load beam 23 includes a baseplate (or mounting block) 48 which is pivotally connected to the head arm 18A via the micro-actuator 21. The micro-actuator 21 may be a piezoelctric transducer or any other means capable of providing minute actuations. The baseplate 48 extends forward to a bend region 53 which, in turn, projects forward into a flexure 56. The load beam 23 is typically etched as a single piece from stainless steel sheet stock or some other suitable material.

As previously explained, the head arm 18A moves toward the destination track 40 in a macro-actuated rotary movement. As the slider 27 is coarsely positioned above the track 40, the micro-actuator 21 then causes the load beam 23 to rotate slightly about the axis 22 so as to align the slider 27 with the track 40 for minimizing the skew angle "s" and achieving better track registration. The micro-actuation movement of the load beam 23 is controlled by a drive circuit (not shown) that forms part of the disk drive control electronics. The rotation of the HGA 20 about the axis 22 occurs independently of the rotation of the head arm 18A about the axis 16.

In another embodiment of the HGA 20, the micro-actuation movement of the load beam 23 occurs during the macro-actuation of the head arm 18A in order to reduce the seek time of the disk drive. In this design the disk 14 may be mapped, with the disk tracks 40 being assigned micro-actuation values that are tabulated and stored. As the drive circuit identifies the track 40 to be accessed, it instructs the micro-actuator 21 to assume a relative angular position relative to the head arm 18A while the head arm 18A is moving toward track 40.

Figure 4:
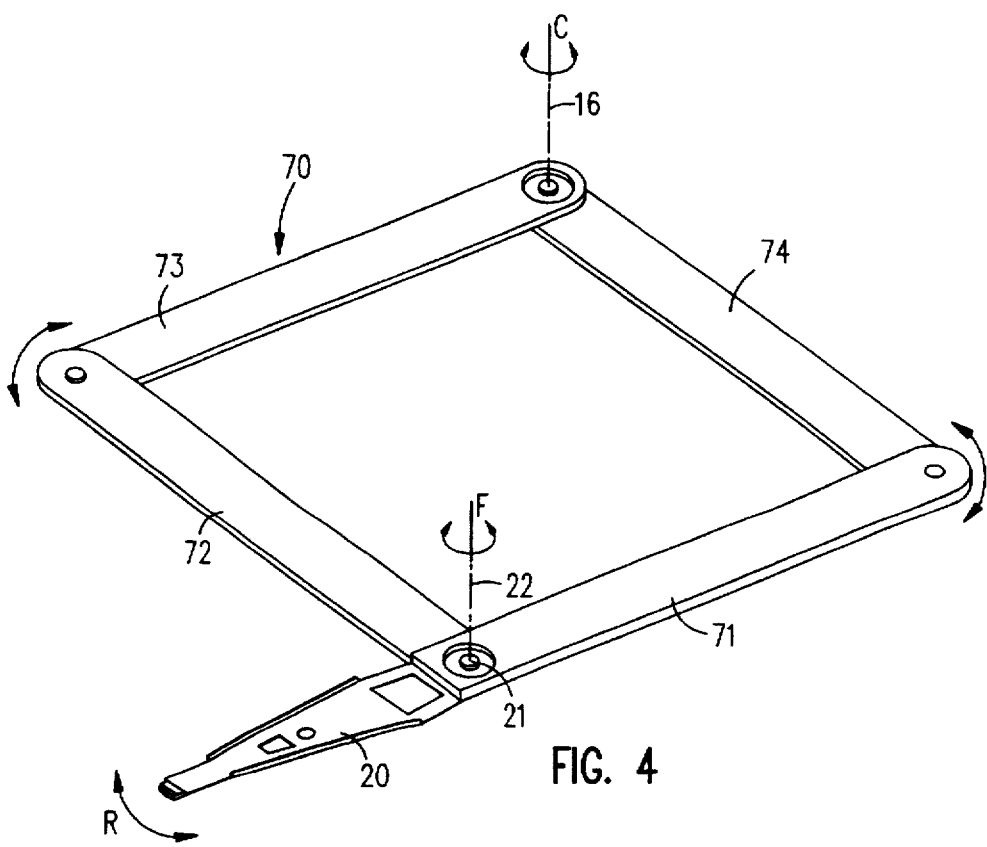
FIG. 4 is a perspective view of an alternative actuator design according to the present invention.

FIG. 4 illustrates an alternative actuator 70 shown rotatably secured to the HGA 20 via the micro-actuator 21. The actuator 70 includes four head arms 71, 72, 73, 74 capable of rotary movement for providing the HGA with a finely controlled linear and rotary micro-actuation movement, as indicated by the arrows L and R respectively. The head arms 71 and 72 are pivotally secured to the HGA 20 via the micro-actuator 21 while the head arms 73, 74 are pivotally secured about the axis 16.

While FIG. 4 illustrates the actuator 70 as having four arms 71–74, it is apparent that a different number of arms may be used.

By virtue of this invention, the flying height of the slider and transducer are maintained substantially constant across the entire surface of the disk, thus allowing an increase in the areal density of the disk and as a result improving the capacity of the disk drive. The micro-actuator serves to cancel transient and harmonic vibrations that may occur during operation of the disk drive.

It should be understood that the configuration described herein may be modified within the scope of the invention. For example, the widths and lengths of the various components of the load beam 23 and head arm 18A may be modified depending upon the disk drive operating characteristics. Other modifications may be made when implementing the invention for a particular environment. It should be noted that the invention may be extended to other types of HGA's, such as optical and magneto-optical HGA's.

What is claimed is:

1. A drive comprising:
    a head gimbal assembly including a head;
    an actuator arm pivotally movable about a first actuator axis of rotation, for providing said head gimbal assembly with a macro-actuation movement relative to a destination track, and for positioning said head in an initial position relative to said destination track;
    said head gimbal assembly being pivotally secured to said actuator arm about a second actuator axis of rotation, for moving said head in a micro-actuation movement relative to said destination track, when said head reaches said initial position, in order to minimize a skew angle formed between said head and said destination track, at said initial position.

2. A drive according to claim 1, wherein said head includes a pole; and
    wherein a line normal to said pole is substantially perpendicular to a tangent to said destination track.

3. A drive according to claim 1, further including a micro-actuator for providing said macro-actuation movement.

4. A drive according to claim 3, wherein said micro-actuator is a piezoelectric-transducer.

5. A drive according to claim 1 for use with a data storage medium that includes a plurality of tracks, wherein said tracks are mapped and assigned micro-actuation values that determine said micro-actuation movement of said head.

6. A drive according to claim 1, including a plurality of actuator arms capable of rotary movement for providing said head with a finely controlled linear and rotary micro-actuation movement.

7. A drive comprising:
    a head gimbal assembly including a head;
    an actuator arm pivotally movable about a first actuator axis of rotation, for providing said head gimbal assembly with a macro-actuation movement relative to a destination track;
    said head gimbal assembly being pivotally secured to said actuator arm about a second actuator axis of rotation, for moving said head in a micro-actuation movement relative to said destination track, during said macro-actuation movement of said head gimbal assembly, in order to minimize a skew angle formed between said head and said destination track.

8. A drive according to claim 7, wherein said head includes a pole; and wherein a line normal to said pole is substantially perpendicular to a tangent to said destination track.

9. A drive according to claim 7, further including a micro-actuator for providing said macro-actuation movement; and wherein said micro-actuator is a piezoelectric-transducer.

10. A drive according to claim 7 for use with a data storage medium that includes a plurality of tracks, wherein said tracks are mapped and assigned micro-actuation values that determine said micro-actuation movement of said head.

11. A drive according to claim 7, including a plurality of actuator arms capable of rotary movement for providing said head with a finely controlled linear and rotary micro-actuation movement.

12. A head gimbal assembly comprising:
    a load beam;
    a head secured to said load beam;

an actuator arm pivotally movable about a first actuator axis of rotation, for providing said load beam with a macro-actuation movement relative to a destination track, and for positioning said head in an initial position relative to said destination track;

said load beam being pivotally secured to said actuator arm about a second actuator axis of rotation, for rotating said head in a micro-actuation movement relative to said destination track, when said head reaches said initial position, in order to minimize a skew angle formed between said head and said destination track, at said initial position.

13. A head gimbal assembly according to claim 12, wherein said head includes a pole; and wherein a line normal to said pole is substantially perpendicular to a tangent to said destination track.

14. A head gimbal assembly according to claim 12, further including a micro-actuator for providing said macro-actuation movement; and wherein said micro-actuator is a piezoelectric-transducer.

15. A head gimbal assembly according to claim 12 for use with a data storage medium that includes a plurality of tracks, wherein said tracks are mapped and assigned micro-actuation values that determine said micro-actuation movement of said head.

16. A head gimbal assembly according to claim 12, including a plurality of actuator arms capable of rotary movement for providing said head with a finely controlled linear and rotary micro-actuation movement.

17. A head gimbal assembly comprising:

a load beam;

a head secured to said load beam;

an actuator arm pivotally movable about a first actuator axis of rotation, for providing said load beam with a macro-actuation movement relative to a destination track;

said load beam being pivotally secured to said actuator arm about a second actuator axis of rotation, for moving said load beam in a micro-actuation movement relative to said destination track, during said macro-actuation movement of said load beam, in order to minimize a skew angle formed between said head and said destination track.

18. A head gimbal assembly according to claim 17, wherein said head includes a pole; and wherein a line normal to said pole is substantially perpendicular to a tangent to said destination track.

19. A head gimbal assembly according to claim 17, further including a micro-actuator for providing said macro-actuation movement; and wherein said micro-actuator is a piezoelectric-transducer.

20. A head gimbal assembly according to claim 17 for use with a data storage medium that includes a plurality of tracks, wherein said tracks are mapped and assigned micro-actuation values that determine said micro-actuation movement of said head.

* * * * *